US012802219B2

(12) United States Patent
Chen

(10) Patent No.: US 12,802,219 B2
(45) Date of Patent: Nov. 17, 2026

(54) METHOD, SYSTEM, AND COMPUTER-READABLE RECORDING MEDIA FOR THE DIAGNOSIS OF INTRACRANIAL ANEURYSMS

(71) Applicant: Taipei Medical University, Taipei City (TW)

(72) Inventor: David Carroll Chen, Taipei City (TW)

( * ) Notice: Subject to any disclaimer, the term of this patent is extended or adjusted under 35 U.S.C. 154(b) by 189 days.

(21) Appl. No.: 18/789,853

(22) Filed: Jul. 31, 2024

(65) Prior Publication Data

US 2025/0078263 A1 Mar. 6, 2025

Related U.S. Application Data

(60) Provisional application No. 63/580,389, filed on Sep. 4, 2023.

(51) Int. Cl.
*G06T 7/00* (2017.01)
*G06T 7/136* (2017.01)

(52) U.S. Cl.
CPC ............ *G06T 7/0012* (2013.01); *G06T 7/136* (2017.01); *G06T 2207/20081* (2013.01); *G06T 2207/30016* (2013.01); *G06T 2207/30101* (2013.01)

(58) Field of Classification Search
CPC ................... G06T 7/0012; G06T 7/136; G06T 2207/20081; G06T 2207/30016; G06T 2207/30101
See application file for complete search history.

(56) References Cited

U.S. PATENT DOCUMENTS 9,757,047 B2 * 9/2017 Chappell .......... G01R 33/56366
10,092,247 B2 * 10/2018 Taylor .................... G16H 50/50
(Continued)

FOREIGN PATENT DOCUMENTS

CN 107644420 B 12/2020
CN 112991314 A 6/2021
(Continued)

OTHER PUBLICATIONS

Office Action from the Taiwan Intellectual Property Office for Application No. 113128630, issued on Sep. 26, 2025.

*Primary Examiner* — Gregory M Desire
(74) *Attorney, Agent, or Firm* — OPES IP Consulting Co., Ltd.

(57) ABSTRACT

This disclosure reveals a method, system, and computer-readable recording medium for the diagnosis of intracranial aneurysms. The method includes: acquiring a first image, the first image being a three-dimensional image having a intracranial aneurysm; generating a mask, and performing intracranial artery segmentation on the first image to obtain a intracranial artery region; using a segmentation model to perform intracranial aneurysm segmentation on the intracranial artery region in the first image to generate a segmentation result; and using a classification model to classify the segmentation result into intracranial aneurysm and non-intracranial aneurysm, and screening out a true positive result from the classification result. This disclosure proposes an artificial intelligence platform-based intracranial aneurysm assisted diagnosis model, optimizing the intracranial aneurysms recognition process and significantly improving the accuracy of intracranial aneurysms recognition.

20 Claims, 6 Drawing Sheets

(56) References Cited

U.S. PATENT DOCUMENTS

| | | | | |
|---|---|---|---|---|
| 11,328,400 | B2 * | 5/2022 | Levi | G06N 3/0464 |
| 11,449,990 | B2 * | 9/2022 | Sato | G06T 7/0012 |
| 11,875,503 | B2 * | 1/2024 | Yang | G06T 7/62 |
| 12,548,152 | B2 * | 2/2026 | Li | G06T 7/0012 |
| 12,561,811 | B2 * | 2/2026 | Wei | G06T 7/11 |
| 2023/0000364 | A1 * | 1/2023 | Ionita | G06T 7/11 |

FOREIGN PATENT DOCUMENTS

| | | | |
|---|---|---|---|
| CN | 113139974 | A | 7/2021 |
| CN | 112150477 | B | 9/2021 |
| CN | 114170143 | A | 3/2022 |
| CN | 115953393 | A | 4/2023 |
| CN | 116402838 | A | 7/2023 |

* cited by examiner

METHOD, SYSTEM, AND COMPUTER-READABLE RECORDING MEDIA FOR THE DIAGNOSIS OF INTRACRANIAL ANEURYSMS

CROSS-REFERENCE TO RELATED APPLICATIONS

This application claims priority of Provisional Application No. 63/580,389, filed on Sep. 4, 2023, the content of which is incorporated herein in its entirety by reference.

FIELD OF THE INVENTION

The present disclosure relates to the field of artificial intelligence, specifically to a method, system, and computer program product for the diagnosis of intracranial aneurysms.

BACKGROUND OF THE INVENTION

Intracranial aneurysm is a dangerous condition in the brain. If it ruptures and starts bleeding, it can lead to a high rate of death and severe disability. Thanks to advances in medical technology, it is now possible to detect unruptured intracranial aneurysms early using non-invasive imaging techniques such as magnetic resonance angiography (MRA) or computed tomography angiography (CTA).

Early diagnosis is crucial for effective clinical management and can help prevent rupture through interventional procedures. However, diagnosing intracranial aneurysms can be challenging due to the small size of the lesions, which can be as small as 1.5 mm, and the large number of CTA and MRA images, which can reach hundreds in one set. Additionally, the complex structure of the intracranial arteries makes manual interpretation time-consuming and labor-intensive. The accuracy of manual interpretation depends heavily on the qualifications of the radiologist, which increases the risk of misdiagnosis and discrepancies in interpretations. It often takes several years of training as a radiologist to develop a consistent reading, and even then, small intracranial aneurysms may still be missed.

SUMMARY OF THE INVENTION

To solve the technical problem of difficult interpretation of intracranial aneurysms, this disclosure provides a method, system, and computer-readable recording medium for determining intracranial aneurysms. By optimizing the intracranial aneurysms recognition process with an AI-based auxiliary diagnostic model for intracranial aneurysms, the accuracy of intracranial aneurysms recognition is significantly improved. Specifically, the technical solutions of this application are as follows:

In the first aspect, the present application discloses an embodiment of a method for determining intracranial aneurysms. The method includes the following steps:

(a) acquiring a first image, the first image being a pre-processed three-dimensional image of a intracranial aneurysm;

(b) enhancing a intracranial artery in the first image and performing threshold segmentation on an enhanced first image to obtain a second image containing only the intracranial artery;

(c) using a first-stage detection model to predict a intracranial aneurysms in the second image, screening out a third image containing a suspected intracranial aneurysm region; and (d) using a second-stage segmentation model to segment the intracranial aneurysm region in the third image, obtaining a fourth image containing the intracranial aneurysm region.

In some embodiments, Step (b), which enhances a intracranial artery in the first image and performs threshold segmentation on an enhanced first image to obtain a second image containing only the intracranial artery, further includes the following steps:

(b1) using a second-order Hessian matrix to perform feature analysis on the first image, obtaining a characteristic value of the second-order intensity variation for each pixel point in the first image;

(b2) determining that a target pixel point belongs to a intracranial artery if a characteristic value of the target pixel point meets a threshold condition, and further merging all pixel points belonging to the intracranial artery to form a intracranial artery path; and (b3) segmenting and retaining the image content on the intracranial artery path, removing an image content outside the intracranial artery path, obtaining the second image containing only the intracranial artery.

In some embodiments, Step (c), which uses a first-stage detection model to predict a intracranial aneurysms in the second image to screen out a third image containing a suspected intracranial aneurysm region, further includes the following steps:

(c1) using a sliding window segmentation method to divide the second image along the intracranial artery path to obtain a plurality of sub-images;

(c2) sending the plurality of sub-images in batches to the first-stage detection model to predict a intracranial aneurysms location; and (c3) processing a prediction result, and screening out the third image containing suspected intracranial aneurysm region.

In some embodiments, the first-stage detection model is a 3D CNN model.

In some embodiments, Step (d), which using a second-stage segmentation model to segment the intracranial aneurysm region in the third image, obtaining a fourth image containing the intracranial aneurysm region, further includes the following steps:

(d1) inputting the third image into the second-stage segmentation model;

(d2) using the second-stage segmentation model to segment a intracranial aneurysms in the third image, obtaining a mask of the intracranial aneurysm region, the mask being used to display the intracranial aneurysm's boundary, location, size, and shape; and (d3) overlaying the mask or its contour on the third image, obtaining the fourth image containing the intracranial aneurysm regions.

In some embodiments, the second-stage segmentation model is a 3D U-Net model.

In some embodiments, prior to using the first-stage detection model to predict the intracranial aneurysms in the second image, the method further includes the following steps:

constructing the first-stage detection model and the second-stage segmentation model;

training the first-stage detection model and the second-stage segmentation model using a semi-supervised learning method with consistency execution strategy.

In some embodiments, prior to training the first-stage detection model and the second-stage segmentation model using a semi-supervised learning method with consistency execution strategy, the method further includes the following steps:

constructing teacher-student models for both the first-stage detection model and the second-stage segmentation model;

using labeled image data as a training set to train a teacher model, obtaining a teacher labeling loss;

using the teacher model to predict unlabeled image data, obtaining the prediction result, and further adding a label to the unlabeled image data, obtaining a reliability of the prediction results;

adding the reliable prediction result as a pseudo-label to a training set, and using the training set to train a student model, obtaining a student unlabeled loss;

combining the teacher labeling loss and the student unlabeled loss to obtain a total loss function, further updating a weight of the student model using the total loss function, and replacing the student model with an updated student model as the new teacher model, continuing training until the model converges.

In another aspect, the present application also discloses a system for determining intracranial aneurysms used for performing the method according to any of the above features. The system includes:

an image acquisition module, used for acquiring a first image, the first image being a pre-processed three-dimensional image of the intracranial aneurysm;

A intracranial artery segmentation module, used for enhancing the intracranial artery in the first image using a Hessian matrix, and performing threshold segmentation on the enhanced first image, obtaining a second image containing only the intracranial artery;

A model construction module, used for constructing a first-stage detection model and a second-stage segmentation model;

A intracranial aneurysm region screening module, used for predicting intracranial aneurysms in the second image using the first-stage detection model, and screening out a third image containing suspected intracranial aneurysm regions; and A intracranial aneurysm region segmentation module, used for segmenting the intracranial aneurysm regions in the third image using the second-stage segmentation model, obtaining a fourth image containing the intracranial aneurysm regions.

In other aspect, the present application further discloses another embodiment of a method for determining intracranial aneurysms. The method includes the following steps:

(a) acquiring a first image, the first image being a three-dimensional image having a intracranial aneurysm;

(b) generating a mask, and performing intracranial artery segmentation on the first image to obtain a intracranial artery region;

(c) using a segmentation model to perform intracranial aneurysm segmentation on the intracranial artery region in the first image to generate a segmentation result; and (d) using a classification model to classify the segmentation result into intracranial aneurysm and non-intracranial aneurysm, and screening out a true positive result from the classification result.

In some embodiments, Step (b), generating a mask, and performing intracranial artery segmentation on the first image to obtain a intracranial artery region, further includes the following steps:

(b1) using a second-order Hessian matrix to perform feature analysis on the first image, obtaining a characteristic value of second-order intensity variations for each pixel point in the first image;

(b2) when the characteristic value of a target pixel point meets a threshold condition, determining that the target pixel point belongs to a intracranial artery, and further merging all pixel points belonging to the intracranial artery to obtain an initial intracranial artery segmentation;

(b3) using an Otsu's algorithm to perform binarization analysis on the first image, classifying each pixel in the first image as a intracranial artery pixel or a background pixel;

(b4) grouping the intracranial artery pixels based on connectivity, screening out a grouping result, and obtaining a intracranial artery seed point; and (b5) merging the initial intracranial artery segmentation with the intracranial artery seed point to obtain the intracranial artery region.

In some embodiments, the grouping result comprises the top 15 to 30 intracranial aneurysm pixel groups by total number, and groups with more than 100 to 200 pixels.

In some embodiments, Step (c), using a segmentation model to perform intracranial aneurysm segmentation on the intracranial artery region in the first image to generate a segmentation result, further includes the following steps:

(c1) using a sliding window cutting method to divide the first image along the intracranial artery region to obtain a plurality of sub-images; and (c2) batch processing the plurality of sub-images through the segmentation model to perform intracranial aneurysm segmentation, generating the segmentation result.

In some embodiments, the segmentation model preferably is a 3D U-Net model.

In some embodiments, Step (d), using a second-stage segmentation model to segment the intracranial aneurysm region in the third image, obtaining a fourth image containing the intracranial aneurysm region, further includes the following steps:

(d1) inputting the segmentation result into the classification model;

(d2) using the classification model to classify the segmentation result into intracranial aneurysm and non-intracranial aneurysm, and excluding false positive results from the classification result; and (d3) generating a intracranial aneurysm mask map based on the remaining true positive result in the classification result.

In some embodiments, the intracranial aneurysm mask map is used to display the boundary, location, size, and shape of the intracranial aneurysm.

In some embodiments, the classification model preferably is a 3D CNN model.

In some embodiments, prior to using the segmentation model to perform intracranial aneurysm segmentation on the intracranial artery region in the first image to generate a segmentation result, further includes the following steps:

constructing the segmentation model and the classification model; and training the segmentation model and the classification model using a semi-supervised learning method with consistency execution strategy.

In some embodiments, the training of the segmentation model and the classification model using the semi-supervised learning method with consistency execution strategy, further includes the following steps:

constructing teacher-student models for both the segmentation model and the classification model;

using labeled image data as a training set to train a teacher model, obtaining a teacher labeling loss;

using the teacher model to predict unlabeled image data, obtaining prediction results, and further adding labels to the unlabeled image data, obtaining the confidence of the prediction results;

adding the high-confidence prediction results as pseudo-labels to the training set, and using the training set to train a student model, obtaining a student unlabeled loss; and combining the teacher labeling loss and the student unlabeled loss to obtain a total loss function, further updating the weights of the student model using the total loss function, and replacing the student model with the updated student model as the new teacher model, continuing training until the model converges.

In others aspect, the present application also discloses another system for determining intracranial aneurysms used for performing the method according to any of the above features. The system includes:

an image acquisition module, used for acquiring a first image, the first image being a three-dimensional image containing a intracranial aneurysm;

a intracranial artery segmentation module, used for performing an initial intracranial artery segmentation on the first image using the Hessian matrix, and performing binarization classification on the first image using Otsu's algorithm, obtaining intracranial artery seed points, merging the initial intracranial artery segmentation with the intracranial artery seed points to obtain the intracranial artery region;

a model construction module, used for constructing the segmentation model and the classification model;

a intracranial aneurysm segmentation module, used for performing intracranial aneurysm segmentation on the intracranial artery region in the first image using the segmentation model; and a intracranial aneurysm classification module, used for classifying the intracranial aneurysm segmentation results using the classification model to screen out true positive results.

In other aspect, the present application further discloses a computer-readable recording medium for determining intracranial aneurysms. The computer-readable recording medium includes computer program or an instruction, wherein the computer program or instruction, when executed by a processor, implement any above of the method.

Compared to the prior art, the present application has at least the following beneficial effects or unexpected results:

1. Establishing a two-stage deep learning model for intracranial aneurysm detection, which retains high sensitivity in the first-stage detection model while quickly screening high-risk image slices. The second-stage segmentation model performs pixel-level segmentation, achieving high sensitivity, high accuracy, and high-quality intracranial aneurysm segmentation.

2. The pre-processed images input into the intracranial aneurysm detection model are segmented along the vessels based on the 3D vascular segmentation modeling results of the Modified Hessian Matrix algorithm to detect community block images. This method avoids misidentifications outside the vessels, significantly reducing computation time during the prediction of the intracranial aneurysm detection model. Additionally, during the training of the intracranial aneurysm detection model, the data only includes vascular parts, excluding other head tissues, making the data distribution more concentrated and allowing the model to better learn the features of the vessels and intracranial aneurysms.

3. Adopting a semi-supervised learning training strategy for further training of the two-stage deep learning model, incorporating the Consistency-Enforcing training strategy and dataset expansion in the training, with the goal of using the unlabeled data to regularize the network, and requiring that the output predictions should not change significantly with respect to the input image applying the actual disturbances to the outputs, so that the outputs have consistency.

4. Providing a comprehensive intracranial aneurysm reading system that integrates vascular segmentation imaging technology and deep learning models to improve detection sensitivity, perform precise quantitative analysis of intracranial aneurysm size and shape, and improve diagnostic accuracy to detect even small lesions, which helps detect intracranial aneurysms at an early stage for timely medical intervention. It can also predict the risk of rupture of the intracranial aneurysm for proactive medical management.

BRIEF DESCRIPTION OF DRAWINGS

One or more specific embodiments are shown in the accompanying drawings by way of example and not by way of limitation. The accompanying drawings are not to scale unless otherwise disclosed. The present disclosure should be understood by those of ordinary knowledge in the art in light of the following detailed description of preferred specific embodiments and with reference to the accompanying drawings.

The above features, technical characteristics, advantages, and their realizations of the present disclosure will be further described below in a clear and easy-to-understand manner in conjunction with the illustrations of the preferred specific embodiments.

DETAILED DESCRIPTION OF THE INVENTION

Figure 1:
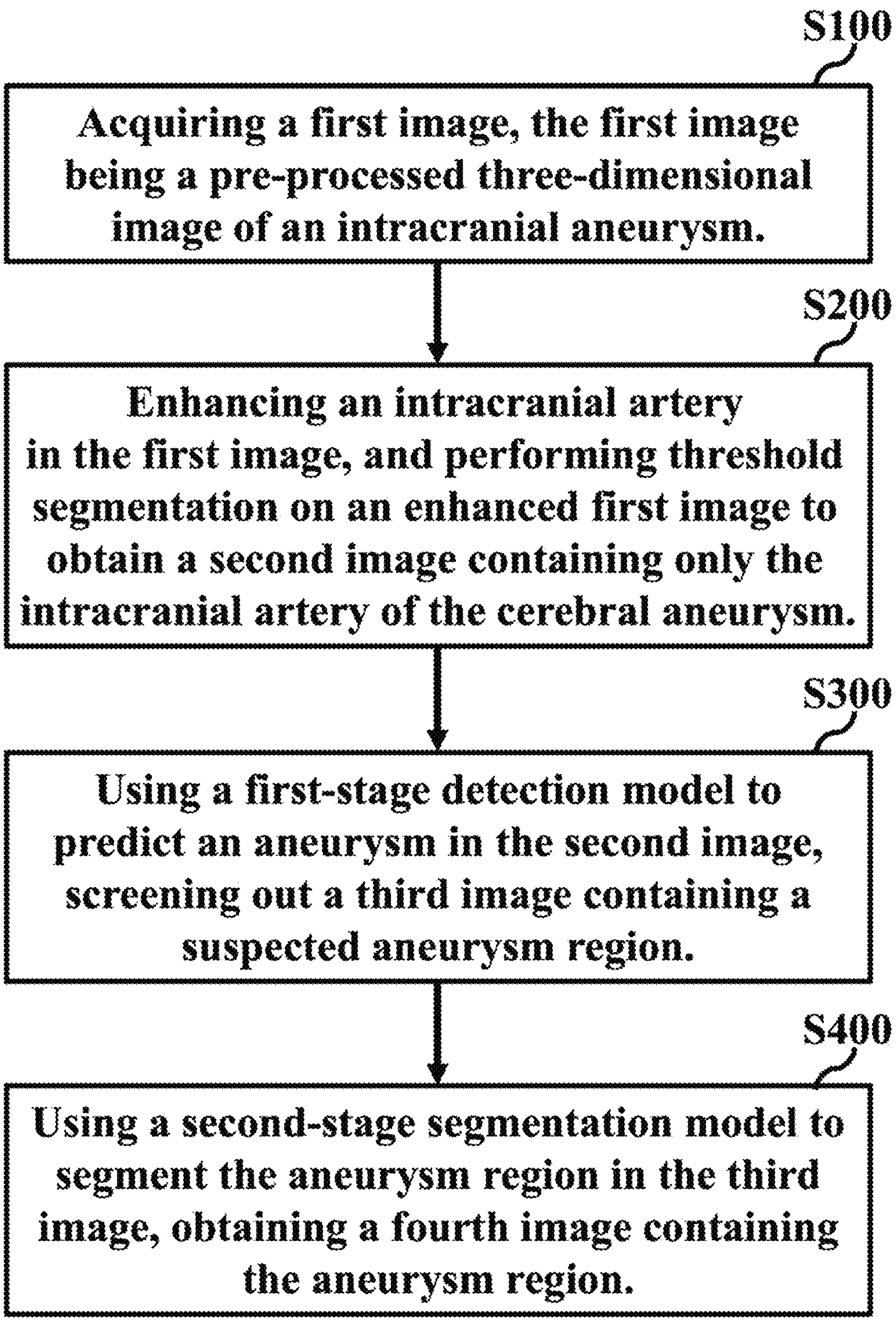
FIG. 1: Flowchart showing an embodiment of the method for determining intracranial aneurysms.

The following descriptions in the present disclosure are primarily intended to illustrate the content of the disclosure and not to limit its scope. Therefore, specific details such as system architecture and techniques are provided to thoroughly explain relevant specific embodiments of this application. However, one person having ordinary skill in the art to which this invention pertains should be able to implement the essence of this disclosure without these specific details.

In certain instances, detailed descriptions of well-known systems, devices, circuits, and methods are omitted to avoid unnecessary details that might obscure the description of the disclosure.

It should be understood that when terms like "comprising," "including" or "includes" are used in the specification and claims of this disclosure, they indicate the presence of described features, integrals, steps, operations, elements, and/or components but do not exclude the presence or addition of one or more other features, integrals, steps, operations, elements, components, and/or collections.

For clarity in the drawings, only parts related to the disclosure are shown schematically, and they do not represent the actual structure as a product. Furthermore, for simplicity and ease of understanding, in some figures, parts with the same structure or function are schematically shown, or only one of them is labeled. Herein, "one" does not only mean "only one" but can also mean "more than one."

Furthermore, it should be understood that the term "and/or" used in the specification and claims of this application means any combination and all possible combinations of one or more of the associated listed items and includes such combinations.

In the present disclosure, it needs to be explained that unless otherwise explicitly specified and limited, the terms "install," "connect," and "link" should be broadly understood. For example, they can be fixed connections, removable connections, or integrated connections; they can be mechanical connections or electrical connections; they can be direct connections or indirect connections through intermediaries, and they can be internal communications between two components. For those skilled in the art, the specific meanings of these terms in this application can be understood according to specific circumstances.

In specific embodiments, the terminal devices described in the specific embodiments disclosed in this application include but are not limited to portable devices such as mobile phones, notebook computers, educational tablets, or other tablets with touch-sensitive surfaces (e.g., touch screen displays and/or touchpads). It should also be understood that in certain specific embodiments, the terminal device is not a portable communication device but a desktop computer with a touch-sensitive surface (e.g., touch screen display and/or touchpad).

Additionally, in the description of the present application, terms like "first" and "second" are only used to distinguish descriptions and should not be understood as indicating or implying relative importance.

To more clearly describe the technical solutions in the specific embodiments or the existing technology in this disclosure, specific implementations of this application will be described below with reference to the accompanying drawings. It is obvious that the accompanying drawings described below are merely some specific embodiments of this application. For those persons having ordinary skill in the art to which this invention pertains, other drawings can be obtained and other possible specific implementations can be derived without inventive labor based on these drawings.

A intracranial aneurysm refers to an abnormal localized dilation of an artery wall caused by the expansion of the artery's lumen. Intracranial aneurysms most commonly rupture in the space between the brain and the thin tissues covering the brain. The formation and growth are due to the pressure exerted by blood flowing through the vessels on the weakened areas of the vessel wall. Intracranial aneurysms are common. However, most intracranial aneurysms are not severe, especially smaller ones. Most intracranial aneurysms do not rupture. They typically do not cause symptoms or health problems. Intracranial aneurysms are often detected when diagnosing other medical conditions. Once an aneurysm ruptures and bleeds, it can seriously cause consciousness disorders or even coma in the patient.

Therefore, early detection and accurate assessment of intracranial aneurysms are crucial for effective medical intervention and reducing the risk of rupture. Current diagnostic methods can early detect unruptured intracranial aneurysms through non-invasive imaging techniques such as Magnetic Resonance Angiography (MRA) or Computed Tomography Angiography (CTA). Early diagnosis aids early clinical handling and potential prevention of rupture through interventional surgery.

However, there are still unmet clinical needs in the current clinical diagnosis of intracranial aneurysms: intracranial aneurysms are relatively small, with diameters as small as 2 millimeters, and CTA and MRA imaging examinations involve substantial quantities, reaching about 200 to 300 images per set, and the intracranial artery structure is complex. Hence, diagnosing intracranial aneurysms is time-consuming and laborious, often requiring years of training for radiology specialists to stabilize readings, posing two challenges. Firstly, there is a relatively high degree of physician discrepancy in clinical CTA and MRA intracranial aneurysm detection, as lesion interpretation may vary with professional level, with studies in prominent international journals such as Stroke indicating that diagnostic rates for intracranial aneurysms grow with specialization and experience. However, limited medical workforce means not every brain imaging examination can be interpreted by a neuroradiologist, posing hidden issues in clinical diagnosis. Moreover, the diagnostic sensitivity for intracranial aneurysms is severely influenced by the lesion's size, with smaller aneurysms more likely to be missed. Considering the aforementioned clinical difficulties and unmet needs, establishing high-performance diagnostic tools to assist detection, improve efficiency, and reduce inconsistent physician judgments is necessary, aiding in improving patient clinical care.

Please refer to FIG. 1, which provides a specific implementation of a method for determining intracranial aneurysms in the present application, including the following steps:

S100, Step (a): Acquire the first image, which is a pre-processed three-dimensional image of the intracranial aneurysm. Specifically, current non-invasive imaging techniques like CTA have limitations, including the need for contrast agents and radiation exposure. In contrast, MRA does not require contrast agents and has no radiation, making it more suitable for screening unruptured intracranial aneurysms. Thus, this implementation uses MR three-dimensional imaging as an example. Analysis of CTA images. CTA has a shorter detection time than MRI and is often used in emergencies. However, it is not available to all patients because of the need to inject a contrast agent into the patient. However, since the patient must be injected with contrast material first, not all patients can use it. In addition, because of the contrast material injection, the threshold for AI model construction is lower, depending on the high contrast of the images. Of course, based on the same technical concept as this application, in other implementations, the diagnosis of intracranial aneurysms using images obtained by other existing techniques, such as CT or CBCT, should also be within the scope of protection of this application.

S200, Step (b): Enhance the intracranial artery in the first image and perform threshold segmentation on the enhanced first image to obtain a second image containing only the intracranial artery. Specifically, brain vessel 3D modeling using the Hessian matrix algorithm identifies the brain vessels' locations, segments out community block images along the vessel location for input into the aneurysm detection model, avoiding false positives outside the vessel area and significantly reducing sliding window computation time.

S300, Step (c): Use a first-stage detection model to predict intracranial aneurysms in the second image and further screen out a third image containing suspected intracranial aneurysm regions.

S400, Step (d): Use a second-stage segmentation model to segment the intracranial aneurysm regions in the third image, and further obtaining a fourth image containing the intracranial aneurysm regions. Specifically, in intracranial aneurysm detection, a single-stage AI detection model may produce many false positives due to high sensitivity requirements and difficulty balancing quality parameters. Therefore, this application designs a two-stage architecture where the first-stage detection model quickly screens high-risk image slices with high sensitivity, and the second-stage segmentation model produces pixel-level segmentation, reducing false positives in small positive sample areas, achieving high-sensitivity, high-accuracy, and high-quality intracranial aneurysm segmentation.

Another embodiment of a method for determining intracranial aneurysms disclosed in the present application is based on the embodiments of the method described above. In Step (b) (i.e., Step S200): enhance the intracranial artery in the first image and perform threshold segmentation on the enhanced first image to obtain a second image containing only the intracranial artery, specifically including the following steps:

S210, Step (b1): Use a second-order Hessian matrix to perform feature analysis on the first image, obtaining the characteristic value of the second-order intensity variations for each pixel point in the first image.

S220, Step (b2): Determine that a target pixel point belongs to an intracranial artery if the characteristic value of the target pixel point meets a threshold condition, and further merge all pixel points belonging to the intracranial artery to form an intracranial artery path.

S230, Step (b3): Segment and retain the image content on the intracranial artery path, remove the image content outside the intracranial artery path, and obtain the second image containing only the intracranial artery.

In other specific embodiment of the present disclosure, Step (b) (i.e., Step S200) is specifically explained as follows: by performing feature analysis on the Hessian matrix, the image features are obtained, capturing the local second-order intensity variations near each pixel point. The specific formula is as follows:

$$H = \nabla^2 I = \begin{pmatrix} Ixx & Ixy & Ixz \\ Iyx & Iyy & Iyz \\ Izx & Izy & Izz \end{pmatrix}$$

Wherein ∇ is the gradient operator; I is the target pixel; Ixx is the second-order intensity variation of the target pixel in the xx plane; Ixy is the second-order intensity variation of the target pixel in the xy plane; Ixz is the second-order intensity variation of the target pixel in the xz plane; Iyx is the second-order intensity variation of the target pixel in the yx plane; Iyy is the second-order intensity variation of the target pixel in the yy plane; Iyz is the second-order intensity variation of the target pixel in the yz plane; Izx is the second-order intensity variation of the target pixel in the zx plane; Izy is the second-order intensity variation of the target pixel in the zy plane; Izz is the second-order intensity variation of the target pixel in the zz plane.

Building the Hessian matrix of 3D medical images, we can calculate the intensity variation feature values in the X, Y, Z three directions: $\lambda_1$, $\lambda_2$, and $\lambda_3$. Among them, $\lambda_1$ represents the intensity variation along the vessel direction, $\lambda_2$ and $\lambda_3$ represent the intensity variations perpendicular to the vessel direction. According to the vessel structure, in TOF-MRA images, the gray value of the vessels is high, contrasting with the relatively darker background. The intensity variation along the main vessel direction is significantly smaller than the variation perpendicular to the vessel direction. This can be used as a consistency criterion to distinguish vessel structures. Based on this, the feature values well describe the vessel structures. When the values of $\lambda_2$ and $\lambda_3$ of a pixel point are large, and the value of $\lambda_1$ is small, it is likely to belong to a vessel. The specific judgment condition is shown in the following formula:

$$\begin{cases} |\lambda_1| \approx 0 \\ |\lambda_1| \ll |\lambda_2| \\ \lambda_2 \approx \lambda_2 < 0 \end{cases}$$

Wherein $\lambda_1$ is the intensity variation feature value of the target pixel in the X direction; $\lambda_2$ is the intensity variation feature value of the target pixel in the Y direction; $\lambda_3$ is the intensity variation feature value of the target pixel in the Z direction.

Figure 2:
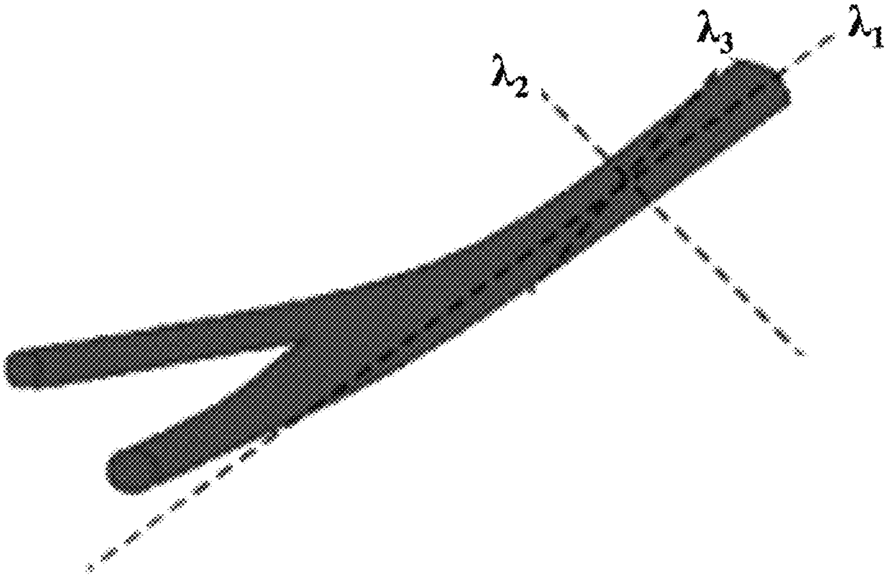
FIG. 2: Schematic diagram displaying Hessian matrix direction feature values in the intracranial artery region.
Figure 3:
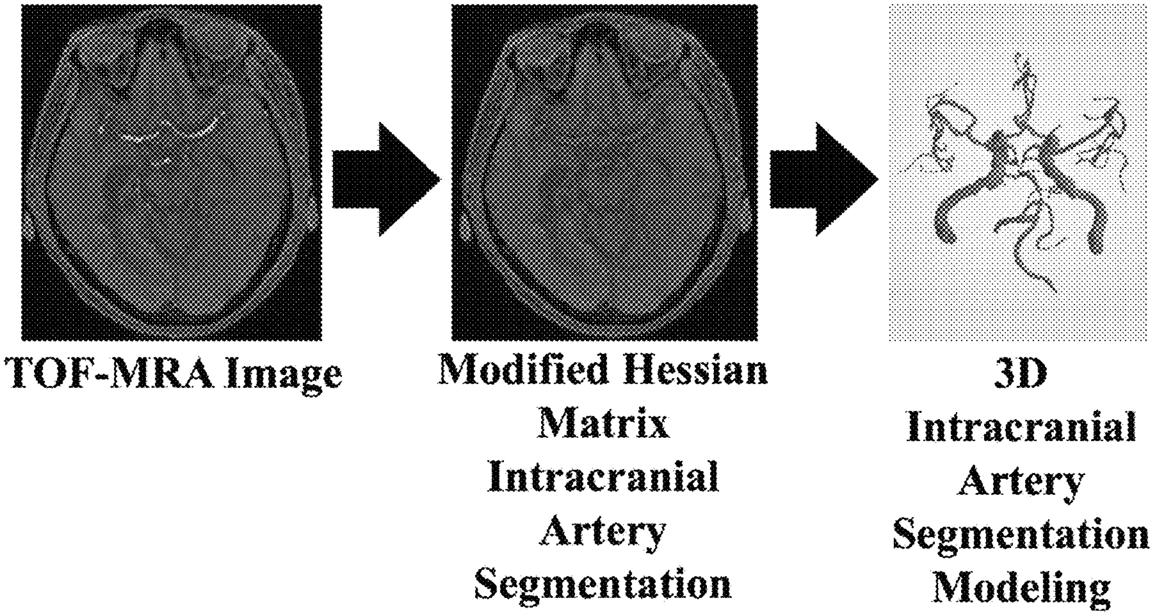
FIG. 3: Flowchart detailing intracranial artery segmentation and reconstruction steps.

Thus, the intensity variations of each pixel point can be combined to form a vessel path. Refer to FIG. 2, which shows a schematic diagram of the directional feature values of the Hessian matrix at the vessel. When the intensity variation $\lambda_1$ is smaller than $\lambda_2$ and $\lambda_3$, it can be determined to belong to the vessel. Currently, 3D vessel segmentation and modeling are performed using the Hessian matrix algorithm (Modified Hessian Matrix). Refer to FIG. 3, where the left side of FIG. 3 shows the original Time-of-Flight (TOF) MRA image, the middle image shows the segmented result using the Modified Hessian Matrix algorithm module, and the right image shows the 3D modeling of the segmented result, demonstrating good vessel segmentation.

If the whole brain image is input into the intracranial aneurysm detection model, it may falsely identify bright spots outside the vessel as suspected aneurysms, generating too many false positives, making it difficult to assist doctors. Therefore, in this implementation, the pre-processed images input into the aneurysm detection model are segmented along the vessel path based on the 3D vessel segmentation modeling results using the Hessian matrix algorithm. Refer to FIG. 3. Segment the red areas in the image and then reconstruct the vessels. After obtaining the vessel model, proceed to the next step of intracranial aneurysms recognition, avoiding misidentifications outside the vessel and significantly reducing computation time during aneurysm detection model prediction. Furthermore, during aneurysm detection model training, the data only includes vessel parts, excluding other head tissues, making the data distribution more concentrated, allowing the model to better learn the features of vessels and intracranial aneurysms during training.

In another embodiment of a method for determining intracranial aneurysms disclosed in the present application, based on any embodiments of the aforementioned method. In Step (c) (i.e., Step S300): Use a first-stage detection model to predict a intracranial aneurysms in the second image, and screen out a third image containing a suspected intracranial aneurysm region, specifically including the following steps:

S310, Step (c1): Use a sliding window segmentation method to divide the second image along the intracranial artery path to obtain a plurality of sub-images.

S320, Step (c2): Send the plurality of sub-images in batches to the first-stage detection model to predict a intracranial aneurysms location.

S330, Step (c3): Process a prediction result and screen out the third image containing suspected intracranial aneurysm region.

In the present embodiment, the first-stage detection model uses a 3D CNN model as an example. Using other existing models, such as VGG, ResNet, YOLO, U-Net, etc., as the first-stage detection model should also fall within the scope of the present disclosure.

Figure 4:
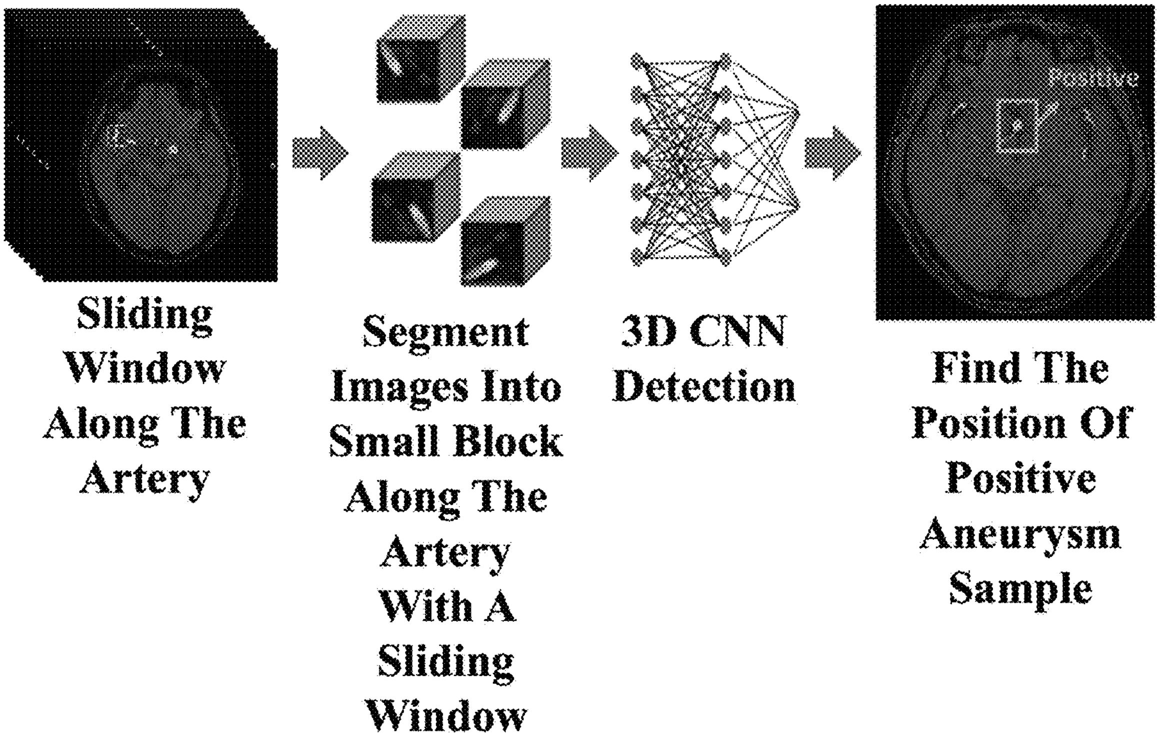
FIG. 4: Flowchart outlining the execution steps of the intracranial aneurysm detection model.

Refer to FIG. 4. Specifically, the first-stage aneurysm detection model in the present disclosure segments the TOF-MRA images into vascular small blocks along the vessel range generated by the 3D vascular segmentation modeling module using the Hessian matrix algorithm (Modified Hessian Matrix). It detects the location of intracranial aneurysms using a 3D CNN architecture with a sliding window. This method quickly screens high-risk image positions. FIG. 4 shows a flowchart of the steps executed by the aneurysm detection model, which segments the TOF-MRA images through vascular modeling, uses the aneurysm detection model to find the position of positive aneurysm samples, and significantly reduces irrelevant information in the entire image, making the model more focused on the intracranial aneurysms on the intracranial vessels. The results are then input into the second-stage aneurysm segmentation model.

In another embodiment of the method for determining intracranial aneurysms disclosed in the present disclosure, Step (d) (i.e., step S400): using the second-stage segmentation model to segment the intracranial aneurysm regions in the third image, obtaining the fourth image containing the intracranial aneurysm regions, includes the following steps:

- S410, Step (d1): Input the third image into the second-stage segmentation model.
- S420, Step (d2): Use the second-stage segmentation model to segment the intracranial aneurysms in the third image, obtaining a mask map of the intracranial aneurysm region. The mask map is used to display the intracranial aneurysm's boundary, location, size, and shape.
- S430, Step (d3): Overlay the mask map or its contour on the third image, obtaining the fourth image containing the intracranial aneurysm regions.

In the present embodiment, the second-stage model is a 3D U-Net model. Using other existing models as the first-stage detection model should also fall within the scope of this application.

Figure 5:
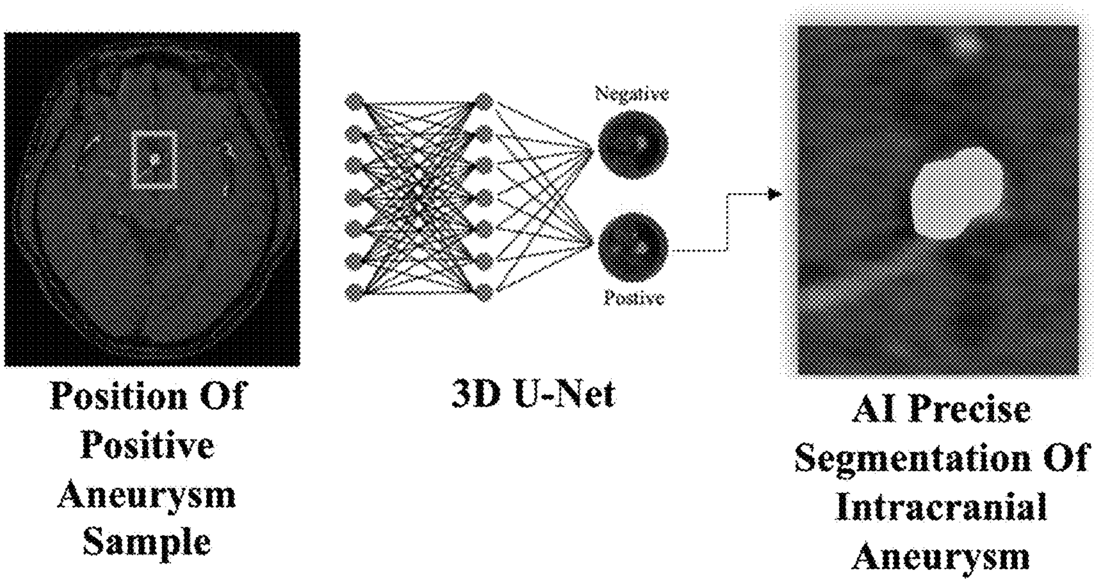
FIG. 5: Flowchart depicting the execution steps of the intracranial aneurysm segmentation model.

Specifically, the second-stage aneurysm segmentation model refines the morphology of the aneurysm predicted by the first-stage aneurysm detection model. Through 3D U-Net, it precisely segments the lesion's position, size, and shape. Refer to FIG. 5, which shows a schematic diagram of the effect of precise aneurysm segmentation after the aneurysm monitoring model's positive sample is processed by the aneurysm segmentation model (3D U-Net model). The positive sample predicted by the first-stage aneurysm detection model is precisely segmented by 3D U-Net for lesion position, size, and shape. Placing the segmentation model in the second stage provides better pixel sensitivity, and inputting the segmentation model in the community block range also enhances the segmentation boundary performance.

In practical applications, this application's AI-assisted diagnostic model for intracranial aneurysm is divided into a two-stage model. In the model test set (including 90 cases of intracranial aneurysms), the first-stage aneurysm detection model's (Aneurysm Detection Model) performance in screening high-risk intracranial aneurysms is excellent (accuracy rate 95.2%, specificity 96.0%). Additionally, the overall detection sensitivity of the second-stage aneurysm segmentation model (Aneurysm Segmentation Model) is 82.2%. Notably, the model's performance is unaffected by the aneurysm size, maintaining 80% sensitivity even for aneurysms less than or equal to 3 millimeters, equivalent to the aforementioned neuroradiologists' level.

Comparing (1) the AI model alone; (2) physicians without AI assistance; and (3) physicians using our AI platform. The test results show that (1) the AI model alone detects intracranial aneurysms with 84.7% sensitivity (312/367); (2) physicians without AI assistance have about 84.2% sensitivity (310/367); (3) physicians using AI achieve 96.7% sensitivity (355/367), indicating the AI model's performance is comparable to physicians' interpretations, consistent with the aforementioned internal test set results. More notably, we found that the AI model and physicians' interpretations are complementary: the lesions missed by the AI model and those missed by physicians often do not overlap. Physicians are more likely to make mistakes when the patient has multiple intracranial aneurysms. When there is more than one aneurysm, physicians are likely to miss the second or third aneurysm, even if these lesions are near the already diagnosed lesion. This may relate to human inertia and fatigue when performing high-intensity repetitive tasks, leading to relaxation after finding the first lesion and missing others, whereas AI does not have this issue. Conversely, the AI model is more likely to miss fewer common lesions in the training set (rare locations and types), even if the lesion size is not necessarily very small, while physicians are less likely to miss such lesions. This complementarity between the AI model and physicians' interpretations allows physicians using AI-assisted interpretations to achieve up to 96.7% diagnostic sensitivity, meaning physicians using AI can reduce the misdiagnosis rate by 12.5% compared to those not using AI, with significant benefits. This further enables early diagnosis, regular tracking, and proper management to prevent aneurysm rupture and hemorrhagic stroke complications.

In another embodiment of a method for determining intracranial aneurysms disclosed in the present application, based on any embodiments of the aforementioned method, before using the first-stage detection model to predict intracranial aneurysms in the second image, the following steps are included:

Step S010: Construct the first-stage detection model and the second-stage segmentation model.

Step S020: Train the first-stage detection model and the second-stage segmentation model using a semi-supervised learning method with consistency execution strategy.

In this disclosure, Step S020: training the first-stage detection model and the second-stage segmentation model using a semi-supervised learning method with consistency execution strategy further includes the following steps:

Step S021: Construct the teacher-student models for both the first-stage detection model and the second-stage segmentation model.

Step S022: Use labeled image data as a training set to train the teacher model, obtaining the teacher labeling loss.

Step S023: Use the teacher model to predict unlabeled image data, obtaining the prediction results. Add labels to the unlabeled image data, obtaining the confidence of the prediction results.

Step S024: Add the high-confidence prediction results as pseudo-labels to the training set. Use the training set to train the student model, obtaining the student unlabeled loss.

Step S025: Combine the teacher labeling loss and the student unlabeled loss to obtain the total loss function. Update the student's model weights using the total loss function and replace the student model with the new teacher model. Continue training until the model converges.

Specifically, to further optimize the intracranial aneurysm segmentation model, this disclosure additionally collects a large amount of clinical unlabeled TOF-MRA images as the training set, using a semi-supervised learning strategy to further train the model.

In other embodiment of the present disclosure, further improvements are made to the training method. Before model training, the labeled data undergoes data augmentation operations, including random flipping, random rotation, random zooming, random translation, and random shearing. For small amounts of labeled training data, significant improvements can be achieved, and even for large amounts of data, improvements can be made.

After performing data augmentation on the training set data, the teacher model is input to obtain prediction labeled, calculating the teacher labeled loss, without updating the model weights. The unlabeled data first undergoes data augmentation operations such as random flipping, then is input into the teacher model to obtain prediction labeled. To convert prediction labeled to pseudo label, the present disclosure incorporates the Consistency-Enforcing training strategy, aiming to use unlabeled data to regularize the network, ensuring the output predictions remain consistent despite applying actual perturbations to the input images.

Figure 6:
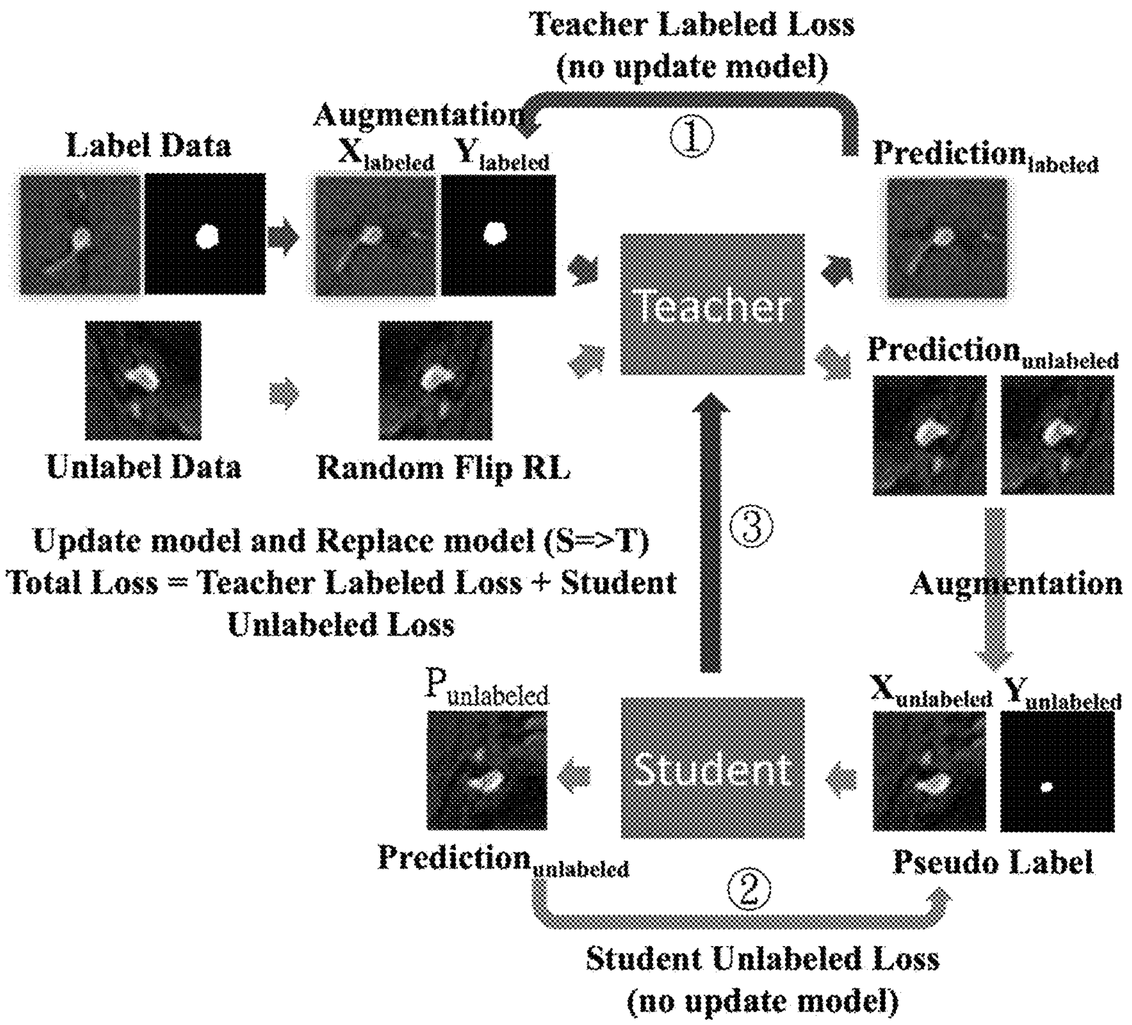
FIG. 6: Flowchart illustrating the semi-supervised learning training process.

In other embodiments of the present disclosure, the semi-supervised learning training process is divided into three main parts, as shown in FIG. 6. The operations are as follows:

S1: Use labeled data, after data augmentation, input it into the teacher model, obtain prediction labeled, and calculate the teacher labeled loss.

S2: Use unlabeled data, after data augmentation, input it into the teacher model, obtain prediction unlabeled. Transform the images and prediction unlabeled after data augmentation, and input them into the student model to obtain prediction labeled and calculate the student unlabeled loss.

S3: Combine the teacher labeled loss and the student unlabeled loss into the total loss function (Total Loss), update the student's model weights, and replace the new teacher model.

Specifically, in this implementation, the actual practice is to first use a specific threshold to convert soft labels to hard labels, and apply actual perturbations to the images and prediction labeled. These actual perturbations are achieved through data augmentation, finally generating image (X unlabeled) and pseudo label (Y unlabeled). Input X unlabeled into the student model to obtain P unlabeled, and calculate the student unlabeled loss with Y unlabeled, without updating the model weights. Finally, combine the teacher labeled loss and the student unlabeled loss into the total loss, update the student's model weights, and replace the new teacher model, continuing training until the model converges.

Figure 7:
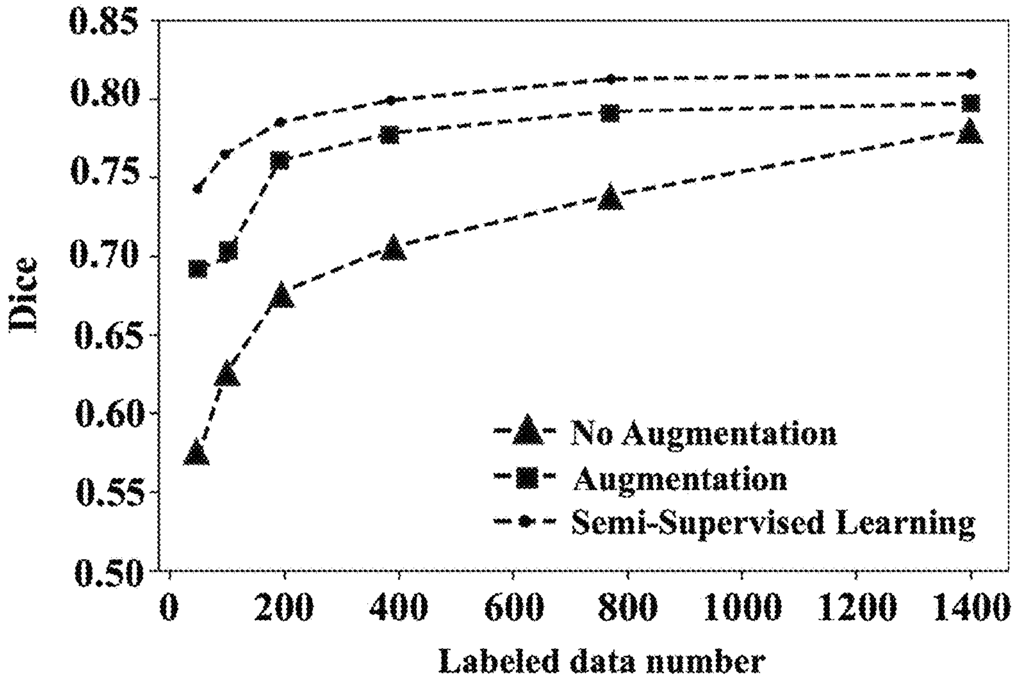
FIG. 7: Comparison chart displaying the training effects using the semi-supervised learning method.
Figure 8:
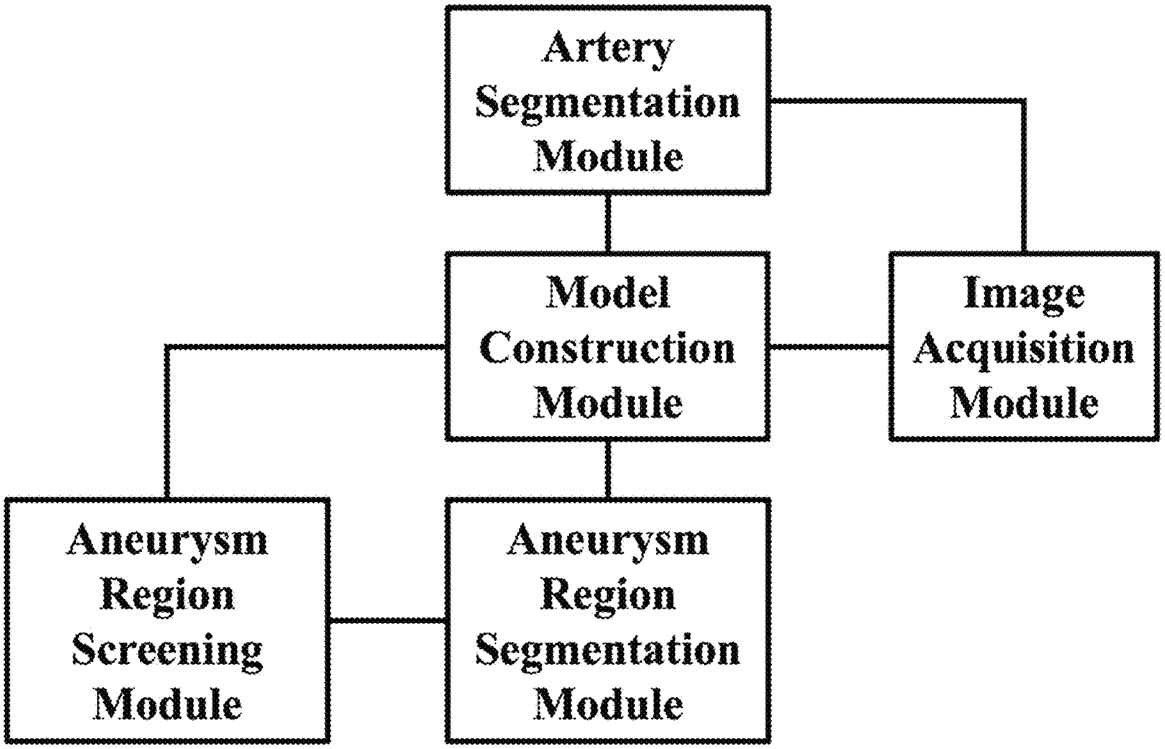
FIG. 8: Structural block diagram of a specific system implementation for determining intracranial aneurysms.

In practical applications, the semi-supervised learning method adopted in the present disclosure improves the performance for various amounts of labeled data. As shown in FIG. 8, in the internal test set results using an extremely small labeled data set of 50 samples, the semi-supervised learning training strategy's Dice coefficient has surpassed the results of about 385 samples without data augmentation, achieving approximately 8 times the data performance gain, with significant improvement in small data sets. Compared with data augmentation results with augmentation, there is also an increase. Statistics show that when there are 192 labeled samples, the training strategy of this application has surpassed the results of using a complete 1400 labeled training samples without data augmentation. When using 1400 labeled samples, the semi-supervised learning performance still improves compared to using data augmentation, proving that this semi-supervised learning strategy is beneficial for both large and small data sets. Refer to FIG. 7, which shows a comparison of training results for different labeled data amounts. As seen in the figure, under any data set amount, the semi-supervised learning strategy results (green line) improve over both the non-augmented (blue line) and augmented (yellow line) methods.

In other embodiments of the present disclosure, the method for determining intracranial aneurysms also includes using a risk prediction module to predict and quantify the rupture risk of lesions. Specifically, the segmented intracranial aneurysm images from the two-stage deep learning model are input into the risk prediction module, which integrates clinical data, lesion characteristics, and related patient information to predict the likelihood of intracranial aneurysm rupture, helping medical staff identify high-risk cases needing immediate attention, thereby reducing the risk of hemorrhagic stroke-related patient death and disability.

Based on the same technical concept, this disclosure also reveals a system for determining intracranial aneurysms, which can implement any method for determining intracranial aneurysms. Specifically, as shown in FIG. 8, an embodiment of a system for determining intracranial aneurysms disclosed in this application includes the follows. An image acquisition module used to acquire the first image that is a pre-processed three-dimensional image of the intracranial aneurysm. A vessel segmentation module used for enhancing the intracranial artery in the first image using the Hessian matrix, performing threshold segmentation on the enhanced first image, and further obtaining the second image containing only the intracranial artery. A model construction module used for constructing the first-stage detection model and the second-stage segmentation model. A intracranial aneurysm region screening module used for predicting intracranial aneurysms in the second image using the first-stage detection model and screening out a third image containing suspected intracranial aneurysm regions. A intracranial aneurysm region segmentation module used for segmenting the intracranial aneurysm regions in the third image using the second-stage segmentation model, and obtaining a fourth image containing the intracranial aneurysm regions.

In another embodiment of the system for determining intracranial aneurysms disclosed in the present application, based on the embodiments of the aforementioned system, the vessel segmentation module further includes the follows. A feature analysis submodule used for performing feature analysis on the first image using the second-order Hessian matrix and obtaining the second-order intensity variations for each pixel point in the first image. A feature value calculation submodule used for constructing the third-order Hessian matrix, analyzing the second-order intensity variations for each pixel point, and obtaining the characteristic value of the third-order intensity variations for each pixel point. When the characteristic value of the target pixel point meets a certain threshold condition, it is determined to belong to a vessel. All pixel points belonging to the vessel are merged to form a vessel path. A path segmentation submodule used for segmenting and retaining the image content on the vessel path, removing the image content outside the vessel path, and obtaining the second image containing only the intracranial artery.

The intracranial aneurysm region screening module is specifically used to perform the following steps:

Using a sliding window cutting method to divide the second image along the vessel path to obtain several sub-images.

Batch sending the sub-images into the first-stage detection model to predict the intracranial aneurysm locations.

Post-processing the prediction results, screening out the third image containing suspected intracranial aneurysm regions.

The intracranial aneurysm region segmentation module is specifically used to perform the following steps, wherein the first-stage detection model is a 3D CNN model:

Inputting the third image into the second-stage segmentation model.

Using the second-stage segmentation model to segment the intracranial aneurysms in the third image, obtaining a mask map of the intracranial aneurysm region. The mask map is used to display the intracranial aneurysm's boundary, location, size, and shape.

Overlaying the mask map or its contour on the third image, obtaining the fourth image containing the intracranial aneurysm regions. The second-stage model is a 3D U-Net model.

Another embodiments of the system for determining intracranial aneurysms provided in the present application, based on any one of the aforementioned embodiments, the model construction module is also used to train the first-stage detection model and the second-stage segmentation model using a semi-supervised learning method with a consistency execution strategy.

Specifically, the model construction module is used to perform the following steps:

Construct the teacher-student models for both the first-stage detection model and the second-stage segmentation model.

Use labeled image data as a training set to train the teacher model, obtaining the teacher labeling loss.

Use the teacher model to predict unlabeled image data, obtaining the prediction results. Add labels to the unlabeled image data, obtaining the confidence of the prediction results.

Add the high-confidence prediction results as pseudo-labels to the training set. Use the training set to train the student model, obtaining the student unlabeled loss.

Combine the teacher labeling loss and the student unlabeled loss to obtain the total loss function. Update the student's model weights using the total loss function, and replace the student model with the new teacher model. Continue training until the model converges.

Figure 9:
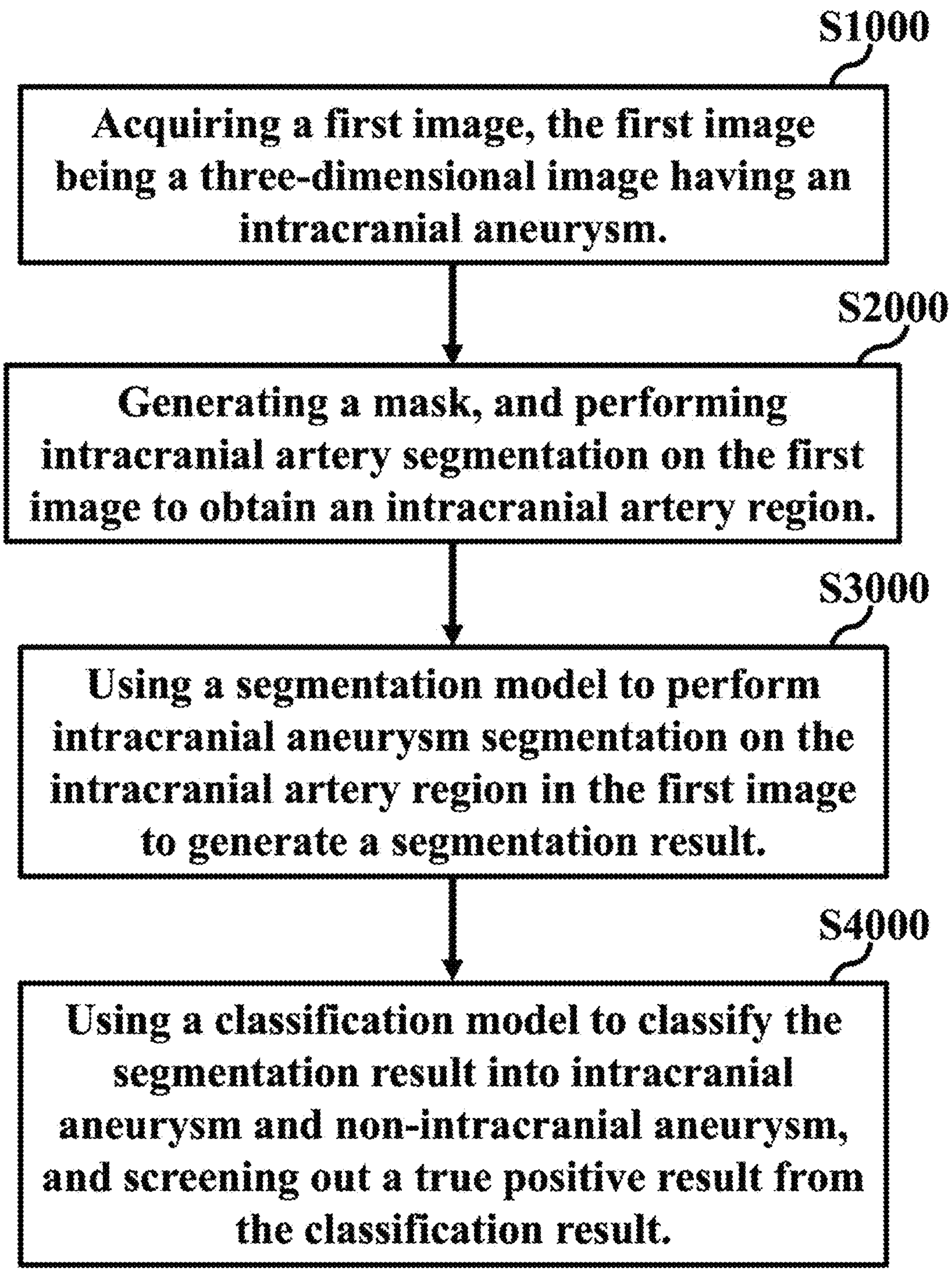
FIG. 9: Flowchart showing another embodiment of the method for determining intracranial aneurysms.

Please refer to FIG. 9. The present disclosure also provides another preferred embodiment of a method for determining intracranial aneurysms. The corresponding features and related descriptions in this step can refer to the content of other specific embodiments previously mentioned. To reduce redundancy, the description will not be repeated here. The following will describe and explain the important content of this preferred embodiment. A preferred embodiment of the method for determining intracranial aneurysms includes the following steps:

S1000, Step (a): Acquiring a first image, the first image is a three-dimensional angiographic image of the brain containing the intracranial aneurysm.

S2000, Step (b): Generating a mask, and performing intracranial artery segmentation on the first image to obtain a intracranial artery region. The mask is a intracranial artery region mask, used to separate the intracranial artery region in the first image for further analysis.

S3000, Step (c): Using a first-stage model (the first-stage model in this preferred embodiment is a segmentation model), performing intracranial aneurysm segmentation on the intracranial artery region in the first image to generate a segmentation result. The specific details and description of the segmentation model in this step can refer to the content of the segmentation model in other specific embodiments previously mentioned.

S4000, Step (d): Using a second-stage model (the second-stage model in this preferred embodiment is a classification model), classifying the segmentation result (i.e., identifying and classifying the possible intracranial aneurysm result segmented by the segmentation model into intracranial aneurysm and non-intracranial aneurysm), and screening out the true positive result in the classification result (i.e., the classification result that still belongs to the intracranial aneurysm). The specific details and description of the classification model in this step can refer to the content of the detection model in other specific embodiments previously mentioned.

Another preferable embodiment of the method for determining intracranial aneurysms disclosed herein is based on the specific embodiment of the method for determining intracranial aneurysms mentioned above. Step (b) (i.e., Step S2000): Generating a intracranial artery region mask, and performing intracranial artery segmentation on the first image to obtain a intracranial artery region, includes the following steps:

S2100, Step (b1): Using a second-order Hessian matrix to perform feature analysis on the first image, obtaining the characteristic value of the second-order intensity variation for each pixel point in the first image. The Hessian matrix operation used in this step can refer to the related description in the previous paragraphs of the present disclosure. To reduce redundancy, the description will not be repeated here.

S2200, Step (b2): When the characteristic value of a target pixel point meets a certain threshold condition, determining that the target pixel point belongs to a intracranial artery, and further merging all pixel points belonging to the intracranial artery to obtain an initial intracranial artery segmentation.

S2300, Step (b3): Using Otsu's Method to perform binarization analysis on the first image. The main purpose is to classify each pixel in the first image (to determine whether each pixel in the first image belongs to a intracranial artery pixel or a background pixel).

S2400, Step (b4): Grouping the pixels belonging to the intracranial artery in the first image based on connectivity, screening the grouping results that meet certain conditions, and using them as intracranial artery seed points. The preferred condition is that the total number of intracranial aneurysm pixels is among the top 15 to 30 groups and the number of cumulative pixels exceeds 100 to 200.

S2500, Step (b5): Merging the initial intracranial artery segmentation with the intracranial artery seed points to obtain the intracranial artery region.

Another specific embodiment of the method for determining intracranial aneurysms disclosed herein is based on the specific embodiment of the method for determining intracranial aneurysms mentioned above. Step (c) (i.e., Step S3000): Using a segmentation model, performing intracranial aneurysm segmentation on the intracranial artery region in the first image to generate a segmentation result. The specific details and description of the segmentation model in this step can refer to the content of the segmentation model in other specific embodiments previously mentioned. Therefore, another preferred embodiment of the method for determining intracranial aneurysms includes the following steps:

S3100, Step (c1): Using a sliding window cutting method to divide the first image along the intracranial artery region to obtain a plurality of sub-images.

S3200, Step (c2): Batch processing the plurality of sub-images through the segmentation model to perform intracranial aneurysm segmentation, generating the segmentation result. In other words, the segmentation result will initially determine the region that belongs to the intracranial aneurysm.

In this preferable embodiment, the preferred segmentation model is a 3D U-Net model. However, other similar models used as segmentation models should also be within the protection scope of the present application.

Another specific embodiment of the method for determining intracranial aneurysms disclosed herein, Step (d) (i.e., Step S4000): Using a classification model to classify the segmentation result into intracranial aneurysm and non-intracranial aneurysm, and screening out the true positive result in the classification result, includes the following steps:

S4100, Step (d1): Inputting the segmentation result generated in Step (c) (i.e., Step S3000 or Step S3200) into the classification model. The specific features and techniques of the classification model can refer to the related technical content of the detection model mentioned previously.

S4200, Step (d2): Using the classification model to classify the segmentation result into intracranial aneurysm and non-intracranial aneurysm, and excluding the false positive result in the classification result. More specifically, the classification model will further classify the segmentation result (i.e., the segmented intracranial aneurysm region) generated in Step (c) (i.e., Step S3000), to further determine whether the segmented intracranial aneurysm region belongs to a intracranial aneurysm or not, and will exclude the result that belongs to a non-intracranial aneurysm (i.e., the false positive result).

S4300, Step (d3): Generating a intracranial aneurysm mask map based on the remaining true positive results in the classification result. As mentioned before, the result that is classified as a intracranial aneurysm (i.e., the true positive result) will be retained, and a corresponding mask will be generated based on the result. The intracranial aneurysm mask map is used to display the boundary, location, size, and shape of the intracranial aneurysm.

In this preferable embodiment, the preferred second-stage model (i.e., the classification model) is a 3D CNN model. However, other similar models should also be within the protection scope of the present application.

A preferred embodiment of the method for determining intracranial aneurysms disclosed herein has specific preferred effects including: significantly reducing processing time (reducing the analysis time for one sample from 7 minutes to about 30 seconds), greatly improving the segmentation effect of intracranial artery, significantly improving the detection effect of intracranial aneurysms, and can be applied to 3D intracranial artery presentation to assist clinical diagnosis. Furthermore, the applicable fields include: it can be applied to intracranial artery skeleton or intracranial artery diameter analysis, intracranial artery stenosis analysis, intracranial artery curvature and hemodynamics analysis, and can be integrated into a complete intracranial artery analysis platform in the future.

Another specific embodiment of the intracranial aneurysm interpretation system provided by the present application, based on any one of the embodiments mentioned above, further comprises the following steps before using the segmentation model to predict intracranial aneurysms in the first image:

Constructing the segmentation model and the classification model; and

Training the segmentation model and the classification model using a semi-supervised learning method with a consistency execution strategy.

Another specific embodiment of the intracranial aneurysm interpretation system provided by the present application, based on any one of the embodiments mentioned above, wherein the training of the segmentation model and the classification model using the semi-supervised learning method with a consistency execution strategy includes the following steps:

Constructing teacher-student models for both the segmentation model and the classification model; using labeled image data as a training set to train a teacher model, obtaining a teacher labeling loss;

Using the teacher model to predict unlabeled image data, obtaining prediction results; adding labels to the unlabeled image data to obtain the confidence of the prediction results;

Adding the high-confidence prediction results as pseudo-labels to the training set; using the training set to train a student model, obtaining a student unlabeled loss; and Combining the teacher labeling loss and the student unlabeled loss to obtain a total loss function; updating the weights of the student model using the total loss function, and replacing the student model with the updated student model as the new teacher model; continuing training until the model converges.

TABLE 1

| Sensitivity (N = 112) | 1-3 mm (N = 30) | 3-7 mm (N = 69) | >7 mm (N = 13) | Total | FPS | Specificity (by slice) |
|---|---|---|---|---|---|---|
| 1st detection method | 80.0% | 82.3% | 83.3% | 82.2% | 1.51 | 96.0% |
| 2nd detection method (Thr.1) | 81.5% | 96.7% | 100% | 94.6% | 1.45 | 98.5% |

TABLE 1-continued

| Sensitivity (N = 112) | 1-3 mm (N = 30) | 3-7 mm (N = 69) | >7 mm (N = 13) | Total | FPS | Speci-ficity (by slice) |
|---|---|---|---|---|---|---|
| 2nd detection method (Thr.2) | 80.9% | 95.6% | 91.7% | 90.6% | 0.84 | 99.0% |

TABLE 2

| Sensitivity (N = 112) | 1-3 mm (N = 30) | 3-7 mm (N = 69) | >7 mm (N = 13) | Total | FPS | Speci-ficity (by slice) |
|---|---|---|---|---|---|---|
| 2nd detection method (Thr.1) | 87.2% | 97.0% | 100% | 94.6% | 1.69 | 98.9% |
| 2nd detection method (Thr.2) | 80.2% | 93.1% | 100% | 90.1% | 0.87 | 99.2% |

Please refer to Table 1. Table 1 shows a preferred embodiment of the method for determining intracranial aneurysms disclosed herein, using 800 known cases (including 112 intracranial aneurysms) for training to optimize the model. First, the terms in the table are explained: Sensitivity represents the ability to correctly identify positive cases, with high sensitivity indicating a low false-negative rate; Specificity represents the ability to correctly identify negative cases, with high specificity indicating a low false-positive rate. Therefore, a positive test result is more certain to indicate the presence of the lesion; FPS (Average of False Positive Per Scan) represents the average number of false positives per scan. The first detection method represents the detection method mentioned at the beginning of the disclosure, which includes the first-stage detection model and the second-stage segmentation model; The second detection method represents the detection method mentioned later in the disclosure, which includes using the segmentation model first and then the classification model; Thr. 1 (Threshold 1) represents threshold 1 or FPS>1; Thr. 2 (Threshold 2) represents threshold 2 or FPS<1. As shown in Table 1, all detections are performed using the method for determining intracranial aneurysms disclosed herein (including both specific embodiments).

Furthermore, when using the preferred embodiment of the method for determining intracranial aneurysms disclosed herein (i.e., the second detection method in Table 1), the model sensitivity is significantly improved. In the same validation set as the first detection method, the sensitivity for intracranial aneurysms of size≥3 mm reaches 97.2% (i.e., [(96.7%*69+100%*13)/(69+13)]*100), and FPS is controlled below 1.45.

Please refer to Table 2. Table 2 shows the test results on a test set of 230 cases obtained from Taipei University Hospital (including a total of 311 intracranial aneurysms). As shown in Table 2, using the preferred embodiment of the method for determining intracranial aneurysms disclosed herein, the model sensitivity is significantly improved, with a sensitivity for intracranial aneurysms of size≥3 mm reaching 97.3% (i.e., [(97.0%*202+100%*25)/(202+25)]*100), and FPS is controlled below 1.69.

Notably, existing techniques (or prior techniques) or products on the market can only effectively detect intracranial aneurysms of size≥4 mm. However, this technology can effectively detect intracranial aneurysms of size≥1 mm using MRA, with even greater efficacy for detecting intracranial aneurysms of size≥3 mm. Therefore, it has an unexpected result compared to existing technologies.

Based on the same technical concept, the present disclosure also discloses a computer program, including computer programs/instructions characterized in that the computer programs/instructions, when executed by a processor, implement the steps of any one of the methods described in the embodiments.

The method, system, and computer program product for determining intracranial aneurysms disclosed in the present application have the same technical features, and the technical details of the embodiments of the three can be applied to each other. To reduce repetition, these are not elaborated here.

One person having ordinary skill in the art to which this invention pertains can understand that for convenience and brevity of description, only the above program modules' division is exemplified. In practical applications, the functions can be assigned to different program modules as needed, completing all or part of the functions described above. The program modules in the embodiments can be integrated into a processing unit, or they can physically exist separately. Multiple units or components can be integrated into one processing unit, which can be realized in hardware form or software program units. Additionally, the specific names of each program module are only for mutual distinction and do not limit the scope of protection of the present disclosure.

In the above embodiments, each embodiment's description has its focus, and the parts not described in detail in a particular embodiment can refer to other embodiments' relevant descriptions.

One person having ordinary skill in the art to which this invention pertains can be aware that the units and algorithm steps described in each example disclosed herein can be implemented in electronic hardware, computer software, or a combination of both. The execution of these functions in hardware or software depends on the specific application and design constraints. A professional technician can choose different methods to implement the described functions for each specific application, but such embodiments should not be considered beyond the scope of the present disclosure.

In the disclosed embodiments, it should be understood that the disclosed devices and methods can be realized in other ways. For example, the above-described device embodiments are merely exemplary. For example, the division of modules or units is only for logical function division. There can be other division methods in practical implementation. For example, multiple units or components can be combined or integrated into another system, or some features can be ignored or not executed. Another point, the coupling or direct coupling or communication connection between the units shown or discussed can be indirect coupling or communication connection through some interface, device, or unit, which can be electrical, mechanical, or other forms.

The units described as separate components can be or not be physically separate. The components displayed as units can be or not be physical units and can be located in one place or distributed across multiple network units. The purpose of implementing the solution of this embodiment can be achieved by selecting part or all of the units according to actual needs.

Additionally, in the various embodiments of the present disclosure, each functional unit may be integrated into one processing unit or may be physically separate units. The integrated unit may be implemented in hardware form or software functional units.

Although specific embodiments of the present disclosure have been described, a person having ordinary skill. In the art once knowing the basic inventive concept can make various changes and modifications to these embodiments. Therefore, the appended claims should be construed to include the preferred embodiments and all changes and modifications falling within the scope of the present disclosure.

It is evident that those person having ordinary skill In the art can make various modifications and variations to this application without departing from the spirit and scope of the present application. Therefore, if such modifications and variations fall within the scope of the claims and their equivalent technologies, the present application also intends to include these modifications and variations.

The invention claimed is:

1. A method for determining an intracranial aneurysm, comprising:

(a) acquiring a first image, the first image being a preprocessed three-dimensional image of the intracranial aneurysm;

(b) enhancing an intracranial artery in the first image using a Hessian matrix-based vessel enhancement to obtain an intracranial artery path, and performing threshold segmentation on the enhanced first image along the intracranial artery path to obtain a second image containing only the intracranial artery;

(c) using a first-stage detection model to predict the intracranial aneurysm in the second image, screening out a third image containing a suspected intracranial aneurysm region; and (d) using a second-stage segmentation model to segment the intracranial aneurysm region in the third image, obtaining a fourth image containing the intracranial aneurysm region.

2. The method according to claim 1, wherein the step (b) comprises:

(b1) using a second-order Hessian matrix to perform feature analysis on the first image, obtaining a characteristic value of the second-order intensity variation for each pixel point in the first image;

(b2) determining that a target pixel point belongs to the intracranial artery if the characteristic value of the target pixel point meets a threshold condition, and further merging all pixel points belonging to the intracranial artery to form the intracranial artery path; and (b3) segmenting and retaining the image content on the intracranial artery path, removing an image content outside the intracranial artery path, obtaining the second image containing only the intracranial artery.

3. The method according to claim 1, wherein the step (c) comprises:

(c1) using a sliding window segmentation method to divide the second image along the intracranial artery path to obtain a plurality of sub-images;

(c2) sending the plurality of sub-images in batches to the first-stage detection model to predict an intracranial aneurysm location; and (c3) processing a prediction result and screening out the third image containing the suspected intracranial aneurysm region.

4. The method according to claim 1, wherein the first-stage detection model is a 3D CNN model.

5. The method according to claim 1, wherein the step (d) comprises:

(d1) inputting the third image into the second-stage segmentation model;

(d2) using the second-stage segmentation model to segment the intracranial aneurysm in the third image, obtaining a mask of the intracranial aneurysm region, the mask being used to display the intracranial aneurysm's boundary, location, size, and shape; and (d3) overlaying the mask or its contour on the third image, obtaining the fourth image containing the intracranial aneurysm regions.

6. The method according to claim 1, wherein prior to using the first-stage detection model to predict the intracranial aneurysms in the second image, further comprises:

constructing the first-stage detection model and the second-stage segmentation model;

training the first-stage detection model and the second-stage segmentation model using a semi-supervised learning method with consistency execution strategy.

7. The method according to claim 6, wherein prior to training the first-stage detection model and the second-stage segmentation model using a semi-supervised learning method with consistency execution strategy, further comprises:

constructing teacher-student models for both the first-stage detection model and the second-stage segmentation model;

using labeled image data as a training set to train a teacher model, obtaining a teacher labeling loss;

using the teacher model to predict unlabeled image data, obtaining the prediction result, and further adding a label to the unlabeled image data, obtaining a reliability of the prediction results;

adding the reliable prediction result as a pseudo-label to a training set, and using the training set to train a student model, obtaining a student unlabeled loss; and combining the teacher labeling loss and the student unlabeled loss to obtain a total loss function, further updating a weight of the student model using the total loss function, and replacing the student model with an updated student model as the new teacher model, continuing training until the model converges.

8. A system for determining intracranial aneurysms, used for performing the method according to any of claims 1 to 7, comprising:

an image acquisition module, used for acquiring a first image, the first image being a pre-processed three-dimensional image of the intracranial aneurysm;

an intracranial artery segmentation module, used for enhancing the intracranial artery in the first image using a Hessian matrix, and performing threshold segmentation on the enhanced first image, obtaining a second image containing only the intracranial artery;

a model construction module, used for constructing a first-stage detection model and a second-stage segmentation model;

an intracranial aneurysm region screening module, used for predicting intracranial aneurysms in the second image using the first-stage detection model, and screening out a third image containing suspected intracranial aneurysm regions; and an intracranial aneurysm region segmentation module, used for segmenting the intracranial aneurysm regions in the third image using the second-stage segmentation model, obtaining a fourth image containing the intracranial aneurysm regions.

9. A method for determining intracranial aneurysms, comprising:

(a) acquiring a first image, the first image being a three-dimensional image having an intracranial aneurysm;

(b) generating a mask using a Hessian matrix-based vessel enhancement, and performing intracranial artery segmentation on the first image to obtain an intracranial artery region;

(c) using a segmentation model to perform intracranial aneurysm segmentation on the intracranial artery region in the first image to generate a segmentation result; and (d) using a classification model to classify the segmentation result into intracranial aneurysm and non-intracranial aneurysm, and screening out a true positive result from the classification result.

10. The method according to claim 9, wherein the step (b) comprises:

(b1) using a second-order Hessian matrix to perform feature analysis on the first image, obtaining a characteristic value of second-order intensity variations for each pixel point in the first image;

(b2) when the characteristic value of a target pixel point meets a threshold condition, determining that the target pixel point belongs to the intracranial artery, and further merging all pixel points belonging to the intracranial artery to obtain an initial intracranial artery segmentation;

(b3) using an Otsu's algorithm to perform binarization analysis on the first image, classifying each pixel in the first image as an intracranial artery pixel or a background pixel;

(b4) grouping the intracranial artery pixels based on connectivity, screening out a grouping result, and obtaining an intracranial artery seed point; and (b5) merging the initial intracranial artery segmentation with the intracranial artery seed point to obtain the intracranial artery region.

11. The method according to claim 10, wherein the grouping result comprises the top 15 to 30 intracranial aneurysm pixel groups by total number, and groups with more than 100 to 200 pixels.

12. The method according to claim 9, wherein step (c) comprises:

(c1) using a sliding window cutting method to divide the first image along the intracranial artery region to obtain a plurality of sub-images; and (c2) batch processing the plurality of sub-images through the segmentation model to perform intracranial aneurysm segmentation, generating the segmentation result.

13. The method according to claim 9, wherein the segmentation model is a 3D U-Net model.

14. The method according to claim 9, wherein step (d) comprises:

(d1) inputting the segmentation result into the classification model;

(d2) using the classification model to classify the segmentation result into intracranial aneurysm and non-intracranial aneurysm, and excluding false positive results from the classification result; and (d3) generating an intracranial aneurysm mask map based on the remaining true positive result in the classification result.

15. The method according to claim 14, wherein the intracranial aneurysm mask map is used to display the boundary, location, size, and shape of the intracranial aneurysm.

16. The method according to claim 9, wherein the classification model is a 3D CNN model.

17. The method according to claim 9, prior to using the segmentation model to perform intracranial aneurysm segmentation on the intracranial artery region in the first image to generate a segmentation result, further comprising:

constructing the segmentation model and the classification model; and training the segmentation model and the classification model using a semi-supervised learning method with consistency execution strategy.

18. The method according to claim 17, wherein the training of the segmentation model and the classification model using the semi-supervised learning method with consistency execution strategy, further comprises:

constructing teacher-student models for both the segmentation model and the classification model;

using labeled image data as a training set to train a teacher model, obtaining a teacher labeling loss;

using the teacher model to predict unlabeled image data, obtaining prediction results, and further adding labels to the unlabeled image data, obtaining the confidence of the prediction results;

adding the high-confidence prediction results as pseudo-labels to the training set, and using the training set to train a student model, obtaining a student unlabeled loss; and combining the teacher labeling loss and the student unlabeled loss to obtain a total loss function, further updating the weights of the student model using the total loss function, and replacing the student model with the updated student model as the new teacher model, continuing training until the model converges.

19. A system for determining intracranial aneurysms, used for performing the method according to any of claims 9 to 18, comprising:

an image acquisition module, used for acquiring a first image, the first image being a three-dimensional image containing an intracranial aneurysm;

an intracranial artery segmentation module, used for performing an initial intracranial artery segmentation on the first image using the Hessian matrix, and performing binarization classification on the first image using Otsu's algorithm, obtaining intracranial artery seed points, merging the initial intracranial artery segmentation with the intracranial artery seed points to obtain the intracranial artery region;

a model construction module, used for constructing the segmentation model and the classification model;

an intracranial aneurysm segmentation module, used for performing intracranial aneurysm segmentation on the intracranial artery region in the first image using the segmentation model; and an intracranial aneurysm classification module, used for classifying the intracranial aneurysm segmentation results using the classification model to screen out true positive results.

20. A non-transitory computer-readable recording medium for determining intracranial aneurysms, comprising a computer program or an instruction, wherein the computer program or instruction, when executed by a processor, implements the method according to any of claims 1 to 5, 6 to 7, and 9 to 18.

* * * * *